May 16, 1933.  G. THOMPSON ET AL  1,909,732
SPRING SHACKLE
Filed May 29, 1931  2 Sheets-Sheet 1

Inventors
George Thompson
I. M. Steele
Henry Maas, Jr.

By Clarence A. O'Brien
Attorney

May 16, 1933.  G. THOMPSON ET AL  1,909,732
SPRING SHACKLE
Filed May 29, 1931  2 Sheets-Sheet 2
Fig. 2.
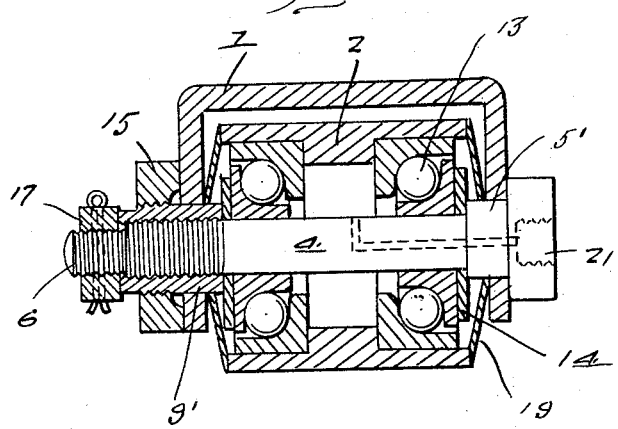
Fig. 8.
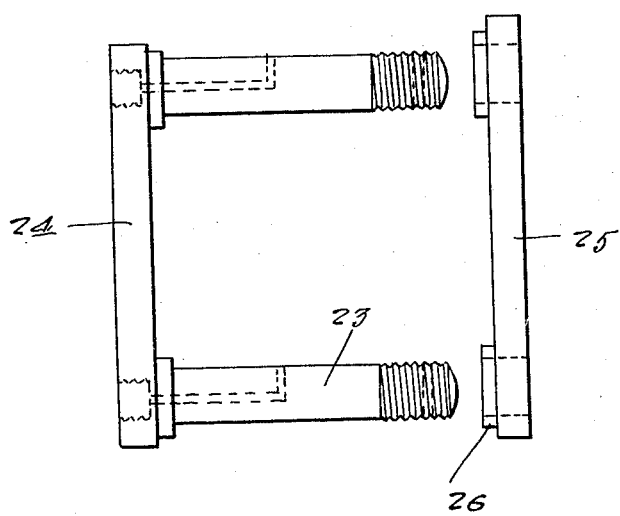
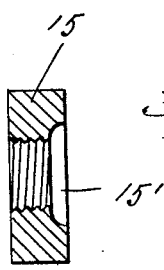
Fig. 7.
Inventors
George Thompson.
I. M. Steele.
Henry Maas. Jr.
By Clarence A. O'Brien
Attorney Patented May 16, 1933

1,909,732

UNITED STATES PATENT OFFICE

GEORGE THOMPSON, IRVING M. STEELE, AND HENRY MAAS, JR., OF WOOD RIVER, ILLINOIS

SPRING SHACKLE

Application filed May 29, 1931. Serial No. 540,966.

This invention relates to a spring shackle, the general object of the invention being to provide a shackle with anti-friction means, with means for adjusting the parts to take up wear without removing the parts, so that the parts can be adjusted in the minimum amount of time, and with but little effort.

This invention also consists in certain other features of construction and in the combination and arrangement of the several parts, to be hereinafter fully described, illustrated in the accompanying drawings, and specifically pointed out in the appended claim.

In describing the invention in detail, reference will be had to the accompanying drawings wherein like characters denote like or corresponding parts thruout the several views, and in which:—

Fig. 2 is a similar view showing another form of the invention.

Fig. 7 is a view of the rear shackle bolt and plates.

Fig. 8 is a sectional view through the sleeve lock nut.

Figure 1:
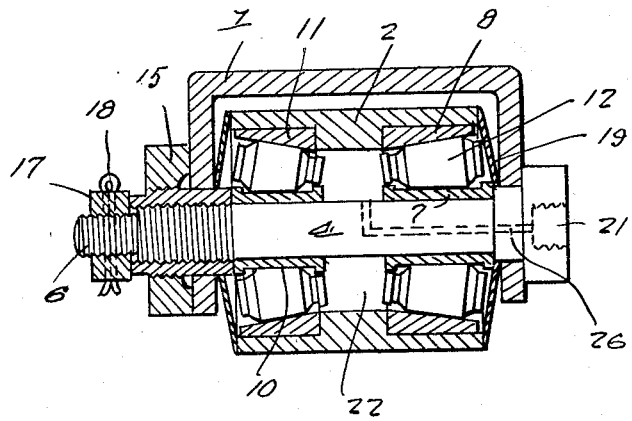
Figure 1 is a sectional view showing one form of the invention.
Figure 3:
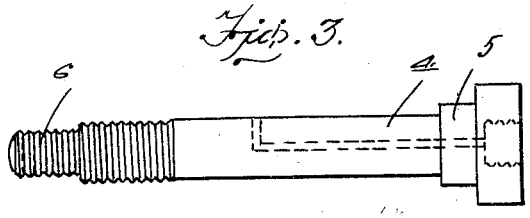
Fig. 3 is a view of the bolt.
Figure 5:
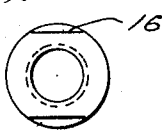
Fig. 5 is an end view of the adjusting sleeve.
Figure 4:
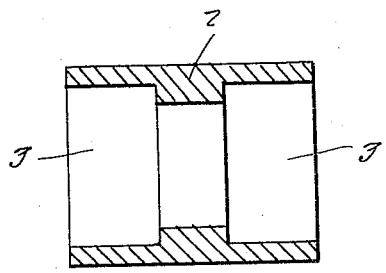
Fig. 4 is a view of the spring eye.
Figure 6:
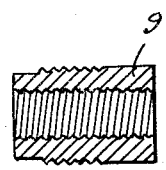
Fig. 6 is a sectional view through said sleeve.

In these drawings, the numeral 1 indicates the channel iron of frame or spring perch and the numeral 2 the spring eye which is provided with a countersink 3 at each end thereof. The numeral 4 indicates a bolt which passes through the member 1 and through the eye member 2, said bolt being formed with a collar 5 at its head end and with a threaded reduced part 6 at its threaded end.

The collar 5 fits in a hole in one limb of the member 1, and said collar forms a shoulder against which a race ring 7 bears, this ring being located on the bolt. The opposing race ring 8 is located in one of the countersinks 3. A sleeve 9 is threaded on the main threaded portion of the bolt and the race ring 10 of the second set of anti-friction means has one end engaging the inner end of this sleeve. The ring 11 of the second set of anti-friction means is located in the second countersink 3 of the member 2.

Fig. 1 shows roller bearings 12 located between the race rings, while Fig. 2 shows the race rings made to fit the ball bearings 13. In the latter case, a disk 14 abuts the outer face of each of the inner race rings as shown in Fig. 2 with one disk abutting the collar 5' and the other the adjusting sleeve 9'.

A lock nut 15 is provided for holding the sleeve 9 in adjusting position, this nut being threaded on the sleeve and having a part engaging one end of the member 1 and the inner face of the nut being formed with a recess 15' for facilitating adjustment of the sleeve as any portion of the plane part of the sleeve projecting from the member 1 will enter this recess.

The outer end of the sleeve is reduced and is plain so that the nut 15 can be readily placed thereon and this end is also provided with a flattened part 16 for enabling the sleeve to be turned by a wrench or the like. A lock nut 17 is threaded on the reduced part 6 and held in adjusted position by a cotter pin 18. A cupped disk grease retainer 19 is placed at each end of the member 2 and has a hole in the center for securing to the bolt and lubricant can be forced through a passage 20 in the bolt from a socket 21 in the head thereof which can receive any kind of a fitting, said lubricant entering the chamber 22 formed at the center of the member 2 so that the parts are well lubricated.

The rear shackle bolt assembly comprises a pair of bolts 23 connected together by a plate 24 with the threaded ends of the bolts adapted to be passed through a plate 25 provided with the shoulders 6 for resting against the race rings, so that by tightening or loosening the nuts from the ends of the bolts, the parts can be adjusted to take up wear.

From the foregoing it will be seen that when the shackle is to be adjusted to take out play and wear, the two lock or jamb nuts are loosened, and then the adjusting sleeve is moved inwardly on the bolt so as to force the cones or race rings tighter against the bearings. After adjustment has been made the jamb nuts are again tightened to prevent slipping.

As will be seen, this device is adjustable so as to prevent rattle and take up wear which will add to the life of the shackle and also eliminate the necessity for rebrushing the shackles thereby saving labor and cost of new parts. It will be also seen that there is no wear on the bolts as all the weight is borne on the bearings, and the races, the bolt being immovable in the frame.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described our invention what we claim as new is:

A device of the class described comprising a supporting member having unthreaded openings therein, a bolt passing through the openings and having a collar at its head end fitting in one of the openings, the threaded end of the bolt having a reduced threaded portion at the end thereof, an adjusting sleeve threaded on the main threaded part of the bolt and passing through the other opening, race rings carried by the bolt, one end of one ring abutting the collar and one end of the other ring abutting the inner end of the adjusting sleeve a tubular member, race rings carried thereby, anti-friction means located between the sets of race rings, the outer portion of the sleeve being threaded exteriorly and said outer portion terminating in a wrench engaging part, a nut threaded on the threaded part of the sleeve and engaging an exterior part of the supporting member, and a nut on the threaded reduced part of the bolt for engaging the outer end of the sleeve.

In testimony whereof we affix our signatures.

GEORGE THOMPSON.
IRVING M. STEELE.
HENRY MAAS Jr.